UNITED STATES PATENT OFFICE.

ROBERT L. CORBY, OF WASHINGTON, DISTRICT OF COLUMBIA, ASSIGNOR, BY MESNE ASSIGNMENTS, TO THE FLEISCHMANN COMPANY, A CORPORATION OF OHIO.

METHOD OF MANUFACTURING DOUGH INGREDIENTS.

1,355,128. Specification of Letters Patent. Patented Oct. 12, 1920.

No Drawing. Application filed June 15, 1917, Serial No. 175,024. Renewed July 29, 1920. Serial No. 399,892.

*To all whom it may concern:*

Be it known that I, ROBERT L. CORBY, a citizen of the United States, residing at Washington, in the District of Columbia, have invented certain new and useful Improvements in Methods of Manufacturing Dough Ingredients, of which the following is a specification.

This invention relates to a method for producing compositions of material of the class of those adapted for use as initial ingredients of the dough batch formed preliminarily to making bread. Compositions of this class lead to important results and give superior qualities to the bread loaves which are formed from the dough containing them.

In order that the method of procedure which I have designed can be readily understood, I will first call attention to some of the qualities of the composition which I aim to ultimately produce.

It is a composition which (1) will insure in the bread made from dough containing it, all of the beneficial characteristics of the bread which has been heretofore made from dough containing relatively large quantities of yeast; (2) will not of itself act diastatically on the starch or other components of the flour in the dough batch; (3) will not have proteolytic action upon the nitrogenous ingredients of the flour in the dough batch; (4) will have a characteristic action of its own upon the nitrogenous components of the flour; (5) will insure a superior texture for the interior parts of the finished bread loaf; (6) will also insure the maintenance within the interior loaf content of a quantity of moisture so that it will remain palatably moist much longer than usual; (7) will produce a palatable crust of pleasing color at relatively low temperature; (8) will enlarge the volume of the dough loaf prior to baking in a relatively short period of time; (9) will insure the maintaining of such enlarged volume until the bread loaf is finally baked; (10) will permit the reducing of the quantity of yeast to a small percentage of that ordinarily used for a given dough batch; (11) will contain sugary components of such nature that in the making of relatively sweet doughs a larger quantity of such sugary components can be added to a given dough batch (without affecting the action of the yeast) than is the case where bodies of the cane sugar class are added to the dough batch at the time the flour of the batch and the other ingredients thereof are initially brought together.

In a suitable receptacle I place approximately proportioned quantities of cereal matters, such as rye malt, barley malt, barley sprouts, and a relatively large quantity of corn together with the proper amount of water. The mass is heated up to, and maintained at a temperature of from 50° to 75° C. for a period of from two to five hours. In due time the starch modifying materials, such as diastase, amylase, and the like, commence their action upon the starch. This action (according to the character of the ingredients) will be of the nature of the liquefying of the starch, or a rendering of it soluble and converting it over into saccharine bodies, maltose largely, a small amount of dextrose and dextrins being also produced.

I employ such materials as the rye malt, the barley malt and barley sprouts in order to provide a suitable quantity of nitrogenous materials or proteins together with mineral salts; and the treatment is so carried on that of the saccharine bodies which are obtained from the starch of the corn (and from the malts, to some extent) as large a proportion as possible will be of the maltose class, non-crystallizable and hydroscopic, in contradistinction from the crystallizable bodies of the cane sugar class, and from those of the dextrose subclass, which are to some extent, though with difficulty, crystallizable.

At the end of the treatment period just referred to, the transformation of the starchy bodies into saccharine materials is substantially completed. The action of the diastase in the mass terminates; but the diastase remains present and still has capability of transforming more starch into sugar if any be brought into contact with it.

After the saccharifying has been completed, the mass in the receptacle may, for present purposes, be regarded as comprising, together with water, (1), the dissolved sugar bodies (maltose) principally, resulting from the conversion of the starch; (2) organized ferments, which, in one or another of various forms, are almost unavoidably present; (3) the unorganized ferments, or bodies of the enzym class, which modify starch, as diastase, amylase, or the like; (4) the unorganized ferments of the proteolytic class, which act upon nitrogenous or protein material; and (5) the proteins themselves, or nitrogenous materials; which, at this stage, may be regarded as comprising some that can be bacterially digested and others that cannot, the latter including some that are coagulable and some that are not.

I next subject this mass to the following treatment, in order to produce a composition which, finally, will be (a) entirely free (so far as activity is concerned) of bodies capable of modifying starch; (b) similarly free from enzyms or ferments of the proteolytic class; (c) free, likewise, of foreign organized ferments; (d) charged with a relatively high percentage of non-crystallizable hygroscopic sugars, such as those of the maltose, glucose, or levulose class which will supply the sugar required for the micro-organic cultures that are utilized, successively, at later stages, and which also will carry and retain a relatively large amount of water even during and through the period of baking the dough; (e) free from the coagulable proteins or nitrogenous materials which, when heated, tend to discolor the composition and the bread; and (f) which will have the other proteins or nitrogenous bodies digested and dissolved and so modified that they will not coagulate or effect discoloration even when, at a later stage, they are subjected to heat, but will be in condition to assist the selected bread ferment, such as yeast, and assist in conditioning the flour ingredients when commingled in the dough.

From a culture mass containing the bacteria of lactic acid, I introduce a suitable amount, say in a ratio of about 6 pounds of the culture to 200 to 300 pounds of the saccharified mass.

The bacteria in due time commence to act upon the maltose, (and such dextrose and dextrin) and generate lactic acid; and also upon the proteins or nitrogenous materials, for the development of cell structure. The degree of acidity rapidly increases. The effects of the actions of the bacteria and the resulting lactic acid upon the various ingredients are somewhat as follows:

As concerns the unorganized ferments of the diastatic and proteolytic classes: They gradually become inactive, and I carry the acidification to the point where they are, as fully as possible, rendered inert.

The organized ferments: If any are present, they are also rendered inert.

In regard to the proteins or nitrogenous materials: some are acted upon by the bacteria, and are left in soluble and non-coagulable form, while others remain in such condition even after the bacterial action, that they can be coagulated, and these I subsequently coagulate and remove, in the way to be described, because they, upon heating, undergo a marked change in color, which is not desirable in the composition.

After the acidification has, as above described, been carried to the first point, viz.: where the diastase and other enzyms or ferments have been rendered inert, and then to the point where the proteins have been properly acted upon, I carry the acidifying to a point considerably beyond these degrees. I aim to have the composition quite acid at the time it is introduced into the dough, even though introduced considerably after the time of its manufacture, having found that this excess acidity is of great importance in respect to the conditioning of the dough and preparing it for the yeast.

After the acidifying treatment, and accomplishing th several purposes thereby, I again subject the mass to a comparatively high heat, for example, to a temperature of from 85° to 95° C. This is for several purposes. I coagulate the protein materials above referred to, which have not been digested or modified by the bacterial action, and which it is desirable should be removed to avoid their discoloring either the composition or the bread. Again, this high heat completes the destruction or the rendering inert of any organized ferments that may happen to have found entrance into the mass, whether at the time of initially bringing together the original components, or at some later time during the treatment. It also sterilizes the mass as concerns any lactic acid bacteria that may remain. And should there be any residue of either the diastatic or proteolytic enzyms or ferments, the heat gives assurance that such residue shall be rendered inert.

However, the acidification is carried to such point as to practically sterilize the composition and prevent the activity of vital micro-organisms, both those then present and any that may enter subsequently.

The mass is now subjected to a filtering action, the mechanism for which may be of any suitable type, provided it be capable of properly separating the liquor element comprising the water and its dissolved components, from the solid parts of the mass, these including the insoluble and coagulated materials.

The liquor element so separated may for present purposes be regarded as comprising, together with the water, (1) the digested proteins or transformed soluble nitrogenous materials, together with (2) the initially produced saccharine matters, mainly maltose, and minor amounts of dextrose and dextrin (remaining after acidification); (3) the soluble starchy residues; and (4) the permanently inert ferment residues.

After the filtration last described, I again subject the separated liquor, with the ingredients in solution, to a relatively high heat. I find it desirable to condense the mass in volume, and I utilize a second application of heat to not only rapidly evaporate the water component but also, in connection with the prior heating and the super-acidifying, to insure sterilization.

I prefer, generally, to condense the liquor down to the point where the heavier contents, instead of being only 10 to 20% of the entire mass, are from 80 to 90%.

The composition, both before condensation and after, is a clear mass of pleasing taste lacking the rank or pronounced taste, or flavors characteristic of the ordinary malt extracts, the latter, as well known, possessing strong flavors and well defined characteristics which, to many, are objectionable. If the cereals originally introduced, namely, the corn and the malt substances are properly selected, or prepared, a liquor mass can be finally obtained which will be quite light in color with a corresponding whiteness in the dough and in the final loaf contents.

As the saccharine bodies which I provide are non-crystallizable, the composition can, after condensation, be stored in suitable vessels (small or large) and the mass will remain homogeneous until the time of its use; this being in contrast with the action of compositions which contain cane sugar, or equivalent crystallizable bodies.

In order that the qualities of a composition produced by following my method (and also the actions of the several constituents) may be readily understood, when introduced as an ingredient in a dough batch, attention is directed to the following:

For example, with 100 pounds of flour are mingled 62 pounds of water, 3½ pounds of the composition, 2 pounds of salt, and 10 to 12 ounces of yeast.

The dough batch containing my composition is subjected to the usual fermentation, loaf-forming, proofing and baking.

No active diastase, protease, or the like, being present, the dough is easily distinguishable from those made with any of the usual malt extracts, which, by predetermination, contain diastatic and proteolytic materials. These, when present, cause a rapid liquefying or dissolving of starch bodies in the dough, and in the presence of water and warm temperature, produce a gummy, dextrin mass. If only a little water is present, the diastatic materials may remain temporarily inert and with suspended activity during the stages of mixing, loaf-forming, and even proofing. But in the higher heat of the oven, during the baking stage, the diastase, if present, acts in its characteristic manner upon the starch, softened by the steam within the loaf, and the interior contents become, as above stated, a viscid, gummy mass; the texture is deteriorated, as well as the color, and the crust becomes harder and thicker.

All of these results are avoided with a diastatically inert composition such as is produced by my process.

Again, as described, the proteolytic materials in the composition also have been rendered inert and the degree of acidity has been carried to a point where they can not become again active during any of the cycle of bread making steps from the initial mixing of the dough to the final baking, even though there is an abundance of nitrogenous gluten and other proteins in the flour. The acidifying above referred to is not carried so far as to cause the disintegration of the gluten or other components of the flour, although it is sufficient to assist in developing the desired qualities of the gluten and to increase its elasticity and stability.

The small amount of yeast which, as noted, can be used with this composition, being supplied with the relatively large quantity of maltose (together with the dextrose and dextrin) above referred to, immediately finds a normal stimulating food at hand and is not compelled to first transform sucrose into levulose, dextrose or equivalents, in order that it (the yeast) may have such stimulating nourishment. The proteins required by the yeast for cell structure are taken not from the flour, but from the proteins in the composition. These have been digested during the stages of treatment above described, and as soon as the yeast is brought into their presence in the dough batch it commences immediately to work on them, the degree of acidity not being such as to interfere with this preference of the yeast to act upon the digested proteins rather than upon those of the flour.

In brief, a small amount of yeast is sufficient to effect rapid fermentation, as it is stimulated by the maltose, dextrose, and similar saccharine bodies, and furnished with digested proteins in the composition, and is relieved of work in modifying or digesting any of the ingredients of the flour.

The loaf expands to a greater volume as the gluten is strengthened and made elastic, and maintains firmly the walls of the cells formed by the fermentation gases.

As noted the maltose, and kindred sugar bodies, which I aim to produce as largely as possible, are non-crystallizable and have considerable water as parts, virtually, of their constitution. This water they persist in retaining for a long period, even in high temperature. This is as above described in contrast with crystallizable sugars, such as cane sugar, which readily part from the water that may accompany them when in solution. Upon the separation of the water the sugar immediately assumes again its crystalline form.

Hence, if cane sugar be added in an appreciable quantity to a dough mass, it tends to lose this water in the heat of baking, or in a relatively short period upon exposure, after baking. But the non-crystallizable hygroscopic sugars tend, as stated, to retain the water with which they are associated. Of such sugar there is sufficient to distribute through the interior content a quantum of water such that the loaf remains and tastes fresh and moist for a period of time considerably longer than does a loaf made with cane sugar.

What I claim is:

1. The method of manufacturing bread dough ingredients, which consists in forming a liquid mass containing saccharine bodies of the maltose class and proteins, acidifying the mass to the point where the diastatic and proteolytic materials are rendered inert, and then more highly acidifying the mass, the acidification being carried to the point where the acid will be sufficient to properly condition the gluten of the dough flour, but not prevent yeast from being nourished by the proteins and the saccharine bodies of the composition.

2. The method of manufacturing bread dough ingredients, which consists in forming a liquid mass containing saccharine bodies of the maltose class and proteins, acidifying the mass to a point where the quantity of acid is in excess of that required to render the diastatic and proteolytic contents inactive, digesting the proteins during the acidification, and separating the liquor of the mass and the bodies in solution from the coagulates and non-dissolved materials.

3. The method of manufacturing bread dough ingredients, which consists in forming a solution containing saccharine bodies of the maltose class and proteins derived from cereals, acidifying the mass to a point where the quantity of acid is in excess of that required to render the diastatic and proteolytic materials inactive, digesting some of the soluble and coagulating the coagulable proteins, then separating the liquor with the materials in solution from the coagulates and the non-dissolved bodies, and then condensing the mass.

4. The method of manufacturing bread dough ingredients, which consists in saccharifying a cereal mass containing starchy bodies and proteins, acidifying the mass to a point beyond that where the quantity of acid renders the diastatic and proteolytic materials inactive, heating the mass to a degree approaching the boiling point, then filtering it and separating the liquor with the bodies in solution from the coagulates and the non-dissolved bodies, and condensing the mass.

5. The method of manufacturing bread dough ingredients, comprising forming a liquid mass containing saccharine bodies of the maltose class and proteins, and acidifying the mass to the point where the diastatic materials are rendered inert and are, during the stages of dough making and baking, maintained inert.

6. The method of manufacturing bread dough ingredients, comprising forming a liquid mass containing saccharine bodies of the maltose class and proteins, digesting the nitrogenous materials of the mass, rendering the diastatic bodies inactive, and acidifying the mass sufficiently to condition the gluten and similar bodies of the dough.

7. The method of manufacturing bread dough ingredients substantially free from active enzyms, bacteria or other ferments, comprising forming a liquid mass containing saccharine bodies of the maltose class and nitrogenous bodies, digesting said nitrogenous bodies, and acidifying the mass with lactic acid sufficiently to condition the gluten and similar bodies of the dough and to substantially sterilize the composition.

8. The method of manufacturing bread dough ingredients substantially free from enzyms, bacteria, or other ferments, comprising forming a liquid mass containing saccharine bodies of the maltose class and proteins, digesting the nitrogenous bodies by lactic acid and acidifying the mass sufficiently to condition the gluten and similar bodies of the dough and to substantially sterilize the composition.

9. The method of manufacturing bread dough ingredients substantially free from dough discoloring coagulates, comprising forming a liquid mass containing saccharine bodies of the maltose class and nitrogenous material, heating the mass and acidifying it with lactic acid to a predetermined degree, viz. until the acidity is sufficient to render non-coagulable and permanently soluble some of the nitrogenous bodies, coagulating the coagulable materials, removing them together with the other solids, and condensing the residue.

10. The herein described method of manufacturing a composition of materials suitable for bread dough ingredients, which consists in saccharifying a suitable cereal mass, then gradually acidifying the mass, carrying the acidification to a point where the diastatic and proteolytic materials are rendered inert, and then to a point where the mass is permanently sterilized diastatically and proteolytically, separating the coagulates and solid contents from the liquor, and then condensing the liquor.

In testimony whereof, I affix my signature, in presence of two witnesses.

ROBERT L. CORBY.

Witnesses:

GEORGE E. EDELIN,
N. CURTIS LAMMOND.